(12) United States Patent
Oh et al.

(10) Patent No.: US 11,455,048 B2
(45) Date of Patent: Sep. 27, 2022

(54) DIGITIZER INCLUDING INTERMEDIATE AND ADHESIVE LAYERS AND DISPLAY DEVICE INCLUDING THE SAME

(71) Applicant: Samsung Display Co., Ltd., Yongin-si (KR)

(72) Inventors: Hwa Jin Oh, Yongin-si (KR); Jae Ho Lee, Yongin-si (KR); Hye Young Yu, Yongin-si (KR); Young Kuil Joo, Yongin-si (KR); Jin Hyun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/172,531

(22) Filed: Oct. 26, 2018

(65) Prior Publication Data
US 2019/0129553 A1    May 2, 2019

(30) Foreign Application Priority Data

Oct. 26, 2017    (KR) .................. 10-2017-0140162

(51) Int. Cl.
*G06F 3/041*    (2006.01)
*G06F 3/0354*   (2013.01)
*G06F 1/16*     (2006.01)
*G06F 3/046*    (2006.01)

(52) U.S. Cl.
CPC .......... *G06F 3/0412* (2013.01); *G06F 1/1643* (2013.01); *G06F 3/03545* (2013.01); *G06F 3/041* (2013.01); *G06F 3/046* (2013.01); *G06F 3/0416* (2013.01); *G06F 2203/04103* (2013.01); *G06F 2203/04106* (2013.01)

(58) Field of Classification Search
CPC ...... G06F 3/0412; G06F 3/046; G06F 3/0416; G06F 3/041; G06F 3/03545; G06F 1/1643; G06F 2203/04106; G06F 2203/04103

See application file for complete search history.

(56) References Cited

U.S. PATENT DOCUMENTS

| 7,268,770 B1* | 9/2007 | Takahata ............. G02F 1/13338 345/173 |
| 10,254,951 B2 | 4/2019 | Kim et al. |
| 2014/0131188 A1* | 5/2014 | Isoda ...................... G06F 3/044 200/600 |
| 2014/0240614 A1 | 8/2014 | Ahn |

(Continued)

FOREIGN PATENT DOCUMENTS

| KR | 10-0486423 B1 | 8/2005 |
| KR | 1020120079595 A | 7/2012 |

(Continued)

*Primary Examiner* — David D Davis
(74) *Attorney, Agent, or Firm* — Lewis Roca Rothgerber Christie LLP (57) ABSTRACT

A display device includes a display panel, a touch panel, and a digitizer. The digitizer includes a first electrode pattern layer, a first cover layer that is thermally deformable at a first thermal deformation temperature or higher, and a first intermediate layer located between the first electrode pattern layer and the first cover layer. The first intermediate layer is thermally deformable at a second thermal deformation temperature or higher. The second thermal deformation temperature is lower than the first thermal deformation temperature.

15 Claims, 4 Drawing Sheets

(56) References Cited

U.S. PATENT DOCUMENTS

| | | | |
|---|---|---|---|
| 2014/0267951 A1 | 9/2014 | Lee et al. | |
| 2015/0060251 A1* | 3/2015 | Wu | G06F 3/044 |
| | | | 200/5 R |
| 2015/0346880 A1* | 12/2015 | Xiao | G06F 3/044 |
| | | | 345/173 |

FOREIGN PATENT DOCUMENTS

| | | |
|---|---|---|
| KR | 1020140062407 A | 5/2014 |
| KR | 10-2014-0108021 A | 9/2014 |
| KR | 10-2014-0112800 A | 9/2014 |

* cited by examiner

DIGITIZER INCLUDING INTERMEDIATE AND ADHESIVE LAYERS AND DISPLAY DEVICE INCLUDING THE SAME

CROSS-REFERENCE TO RELATED APPLICATION

The present application claims priority to and the benefit of Korean Patent Application No. 10-2017-0140162, filed on Oct. 26, 2017, in the Korean Intellectual Property Office, the entire contents of which is incorporated by reference herein.

BACKGROUND

1. Field

One or more aspects of example embodiments of the present disclosure relate to a digitizer and a display device including the same.

2. Description of the Related Art

A display device may include, as an input device, at least one of a touch panel for sensing a touch caused by a finger of a user, and a digitizer for sensing a touch caused by an electromagnetic pen.

The digitizer may be applied to the display device, using various methods such as an electromagnetic resonance (EMR) method, a decompression method, and a capacitance method. In particular, in the EMR method, coordinates are recognized by EMR between the electromagnetic pen and an electrode pattern of the digitizer, regardless of the touch caused by the finger of the user, and hence the user can more comfortably use the electromagnetic pen.

SUMMARY

Aspects of embodiments of the present disclosure provide a digitizer which can prevent separation between a cover layer and an electrode pattern layer while allowing an uneven pattern of the electrode pattern layer not to be viewed by a user, and a display device including the digitizer.

According to some aspects of the present disclosure, there is provided a digitizer including: a first electrode pattern layer; a first cover layer thermally deformable at a first thermal deformation temperature or higher; and a first intermediate layer located between the first electrode pattern layer and the first cover layer, the first intermediate layer being thermally deformable at a second thermal deformation temperature or higher, wherein the second thermal deformation temperature is lower than the first thermal deformation temperature.

The first intermediate layer may cover the first electrode pattern layer. The digitizer may further include a first adhesive layer located between the first intermediate layer and the first cover layer.

The digitizer may further include: a second cover layer thermally deformable at the first thermal deformation temperature or higher; a second electrode pattern layer located between the second cover layer and the first electrode pattern layer; and a substrate located between the first electrode pattern layer and the second electrode pattern layer.

The digitizer may further include: a second intermediate layer covering the second electrode pattern layer, the second intermediate layer being thermally deformable at the second thermal deformation temperature or higher; and a second adhesive layer located between the second intermediate layer and the second cover layer.

The digitizer may further include an impact absorbing layer located on the first cover layer.

At least one of side portion of each of the first cover layer, the first electrode pattern layer, the substrate, the second electrode pattern layer, and the second cover layer may be curved.

The digitizer may further include: a third intermediate layer located between the first adhesive layer and the first cover layer, the third intermediate layer being thermally deformable at the second thermal deformation temperature or higher; and a fourth intermediate layer located between the second adhesive layer and the second cover layer, the fourth intermediate layer being thermally deformable at the second thermal deformation temperature or higher.

The digitizer may further include a second adhesive layer in contact with the second electrode pattern layer, the second adhesive layer being located between the second electrode pattern layer and the second cover layer.

At least one of side portion of each of the first cover layer, the first electrode pattern layer, the substrate, the second electrode pattern layer, and the second cover layer may be curved.

The digitizer may further include a first adhesive layer in contact with the first electrode pattern layer, the first adhesive layer being located between the first electrode pattern layer and the first intermediate layer.

The digitizer may further include: a second cover layer thermally deformable at the first thermal deformation temperature or higher; a second electrode pattern layer located between the second cover layer and the first electrode pattern layer; and a substrate located between the first electrode pattern layer and the second electrode pattern layer.

The digitizer may further include: a second adhesive layer in contact with the second electrode pattern layer; and a second intermediate layer located between the second adhesive layer and the second cover layer, the second intermediate layer being thermally deformable at the second thermal deformation temperature or higher.

According to some aspects of the present disclosure, there is provided a display device including: a display panel; a touch panel located at a top of the display panel; and a digitizer located at a bottom of the display panel, wherein the digitizer includes: a first electrode pattern layer; a first cover layer thermally deformable at a first thermal deformation temperature or higher; and a first intermediate layer located between the first electrode pattern layer and the first cover layer, the first intermediate layer being thermally deformable at a second thermal deformation temperature or higher, wherein the second thermal deformation temperature is lower than the first thermal deformation temperature.

The first intermediate layer may cover the first electrode pattern layer. The digitizer may further include a first adhesive layer located between the first intermediate layer and the first cover layer.

The digitizer may further include an impact absorbing layer located on the first cover layer.

BRIEF DESCRIPTION OF THE DRAWINGS

The above and other aspects and features of the present disclosure will become more apparent by reference to the following detailed description when considered in conjunction with the accompanying drawings, in which.

DETAILED DESCRIPTION

Hereinafter, example embodiments will now be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity and ease of description.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that when an area or element is referred to as being "on," "connected to," or "coupled to" another area or element, it may be directly on, connected, or coupled to the other area or element, or intervening areas or elements may be present therebetween. Conversely, when an area or element is referred to as being "directly on," "directly connected to," or "directly coupled to" another area or element, there are no intervening areas or elements therebetween. In addition, it will also be understood that when an area or element is referred to as being "between" two areas or elements, it can be the only area or element between the two areas or elements, or one or more intervening areas or elements may also be present.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

When a certain embodiment may be implemented differently, a specific process order may be performed differently from the described order. For example, two consecutively described processes may be performed substantially at the same time or performed in an order opposite to the described order.

Expressions such as "at least one of," when preceding a list of elements, modify the entire list of elements and do not only modify the individual elements of the list. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

As used herein, the terms "substantially," "about," "approximately" and similar terms are used as terms of approximation and not as terms of degree, and are intended to account for the inherent deviations in measured or calculated values that would be recognized by those of ordinary skill in the art. Further, these terms as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Figure 1:
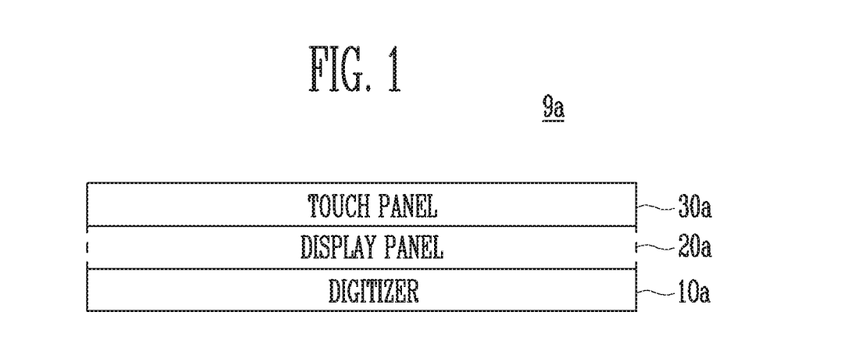
FIG. 1 is a view illustrating a display device according to some embodiments of the present disclosure.

FIG. 1 is a view illustrating a display device according to some embodiments of the present disclosure.

Referring to FIG. 1, a display device 9a according to some embodiments of the present disclosure includes a touch panel 30a, a display panel 20a, and a digitizer 10a.

The touch panel 30a recognizes a coordinate of a position at which a portion of the body (e.g., a finger) of a user is in contact therewith, thereby serving as an input device.

The touch panel 30a may be implemented using a decompression method, a resistance film method, a capacitance method, an infrared method, an ultrasonic method, or any combination thereof. For example, the touch panel 30a may include a plurality of transmission electrodes and a plurality of reception electrodes. When driving voltages sequentially transferred through the transmission electrodes are detected through the reception electrodes, a voltage decreased by a change in capacitance, which is caused by a touch of the user, may be detected by some reception electrodes, thereby determining whether the touch of the user has occurred.

The display panel 20a may include a plurality of pixels and display an image according to the color and luminance of light emitted from each pixel. For example, the display panel 20a may include a liquid crystal layer (LC layer), and control the amount of light transmitted as the light is polarized by allowing orientation of the LC layer to be changed by an electric field, so that a desired image can be displayed. In addition, for example, the display panel 20a may include a plurality of pixels each including an organic light emitting diode (OLED), and control the amount of driving current flowing through the OLED, so that a desired image can be displayed.

The digitizer 10a may be implemented using an electromagnetic resonance (EMR) method, a decompression method, a capacitance method, or any combination thereof. An example embodiment of an EMR method will be described in more detail with reference to FIG. 3.

Figure 2:
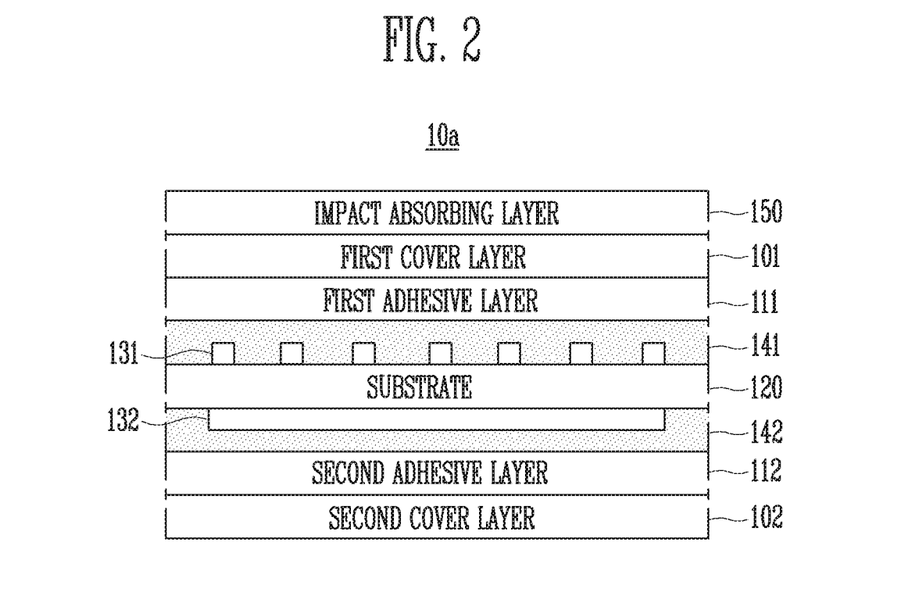
FIG. 2 is a view illustrating a digitizer according to a first embodiment of the present disclosure.

FIG. 2 is a view illustrating a digitizer according to a first embodiment of the present disclosure.

Referring to FIG. 2, the digitizer 10a according to the first embodiment of the present disclosure includes an impact absorbing layer 150, a first cover layer 101, a first adhesive layer 111, a first intermediate layer 141, a first electrode pattern layer 131, a substrate 120, a second electrode pattern layer 132, a second intermediate layer 142, a second adhesive layer 112, and a second cover layer 102.

The substrate 120 may be made of an insulative material. The insulative material may include polyimide (PI). The substrate 120 may allow the first electrode pattern layer 131 to be located on a top surface thereof, and allow the second electrode pattern layer 132 to be located on a bottom surface thereof. The substrate 120 functions to prevent the first electrode pattern layer 131 and the second electrode pattern layer 132 from being in direct electrical contact with each other.

The first electrode pattern layer 131 and the second electrode pattern layer 132 may each be made of a conductive material. The conductive material may include at least one of copper (Cu) and titanium (Ti).

For example, the substrate 120, the first electrode pattern layer 131, and the second electrode pattern layer 132 may be formed by preparing a copper clad laminate (CCL) in which a conductive layer made of a copper material is laminated on both surfaces of the substrate 120, and etching the conductive layer to have a pattern. The shapes and functions of the first electrode pattern layer 131 and the second electrode pattern layer 132 will be described in more detail with reference to FIG. 3.

The first intermediate layer 141 may cover the first electrode pattern layer 131. In addition, the second intermediate layer 142 may cover the second electrode pattern layer 132.

Each of the first intermediate layer 141 and the second intermediate layer 142 may include polyurethane acrylate. For example, after the first electrode pattern layer 131 is formed through etching, the polyurethane acrylate may be formed by slit-coating. The second intermediate layer 142 may be formed through the same process as the first intermediate layer 141.

In this embodiment, the first intermediate layer 141 and the second intermediate layer 142 may be planarization layers. The first intermediate layer 141 may planarize a step difference between the substrate 120 and the first electrode pattern layer 131 (e.g., by covering the height of the first electrode pattern layer 131). Therefore, the layers 111, 101, and 150 located on the top of the first intermediate layer 141 may have a flat shape without any uneven pattern corresponding to the first electrode pattern layer 131. In addition, the second intermediate layer 142 may planarize a step difference between the substrate 120 and the second electrode pattern layer 132 (e.g., by covering the height of the second electrode pattern layer 132). Therefore, the layers 112 and 102 located on the bottom of (i.e., underneath) the second intermediate layer 142 may have a flat shape without any uneven pattern corresponding to the second electrode pattern layer 132.

The first adhesive layer 111 may be located between the first intermediate layer 141 and the first cover layer 101. The first adhesive layer 111 may be a pressure sensitive adhesive (PSA), a thermosetting adhesive, or the like. The first adhesive layer 111 may fix (e.g., bind or secure) the first intermediate layer 141 and the first cover layer 101 by allowing the first intermediate layer 141 and the first cover layer 101 to be adhered to each other.

The second adhesive layer 112 may be located between the second intermediate layer 142 and the second cover layer 102. The second adhesive layer 112 may be a PSA, a thermosetting adhesive, or the like. The second adhesive layer 112 may fix (e.g., bind or secure) the second intermediate layer 142 and the second cover layer 102 by allowing the second intermediate layer 142 and the second cover layer 102 to be adhered to each other.

The first cover layer 101 and the second cover layer 102 may each be made of an insulative material. The insulative material may include PI. The first cover layer 101 and the second cover layer 102 function to protect the circuit elements 131, 132, and 120 of the digitizer 10a, which are interposed therebetween.

In some embodiments the impact absorbing layer 150 may be located on the first cover layer 101. In some embodiments, the impact absorbing layer 150 may be located between the display panel 20a and the first electrode pattern layer 131. For example, the impact absorbing layer 150 may be configured in a stack structure of an embossing layer and a cushion layer. The embossing layer may be a layer for preventing bubbles in a lamination process, and the cushion layer may be a layer for absorbing impact.

According to some embodiments, as described above, the first intermediate layer 141 planarizes the step difference between the first electrode pattern layer 131 and the substrate 120, and the second intermediate layer 142 planarizes the step difference between the second electrode pattern layer 132 and the substrate 120. In addition, the impact absorbing layer 150 may have a flat shape without any uneven pattern, so that it is possible to prevent the first electrode pattern layer 131 and the second electrode pattern layer 132 from being indirectly viewed by a user.

In some embodiments, each of the first cover layer 101 and the second cover layer 102 may be thermally deformed at a first thermal deformation temperature or higher.

In some embodiments, each of the first intermediate layer 141 and the second intermediate layer 142 may be thermally deformed at a second thermal deformation temperature or higher. The second thermal deformation temperature may be lower than the first thermal deformation temperature.

Figure 3:
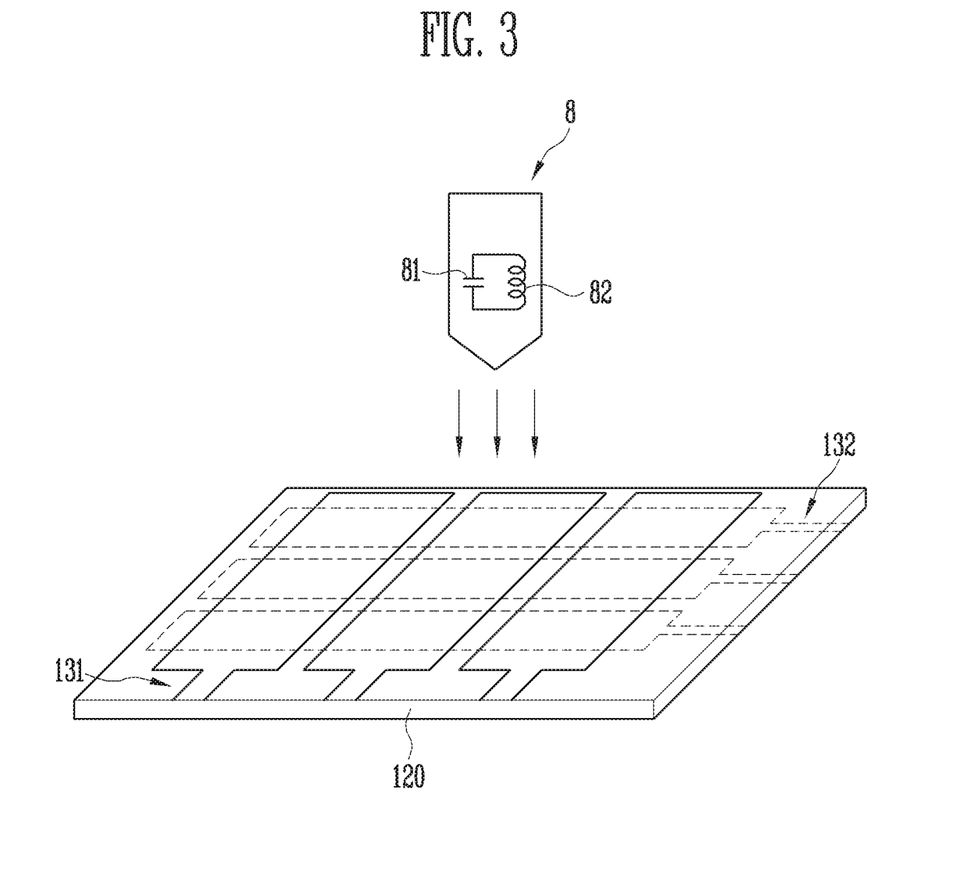
FIG. 3 is a view illustrating an operating principle of the digitizer.

FIG. 3 is a view illustrating an operating principle of the digitizer.

Referring to FIG. 3, the first electrode pattern layer 131 may be located on the top (e.g., top surface) of the substrate 120, and the second electrode pattern layer 132 may be located on the bottom (e.g., bottom surface) of the substrate 120. This is an example structure, and various other structures, such as a bridge structure, may be employed in which the first electrode pattern layer 131 and the second electrode pattern layer 132 are not directly connected to each other.

In FIG. 3, the digitizer 10*a* is implemented using the EMR method. The first electrode pattern layer 131 may include a plurality of electrodes that have a loop shape and extend in a first direction. The second electrode pattern layer 132 may include a plurality of electrodes that have a loop shape and extend in a second direction. The first direction and the second direction may be directions perpendicular to each other.

In some embodiments, an electromagnetic pen 8 may include a resonant circuit having a capacitor 81 and a coil 82.

For example, a magnetic field or electromagnetic field emitted from the electromagnetic pen 8 may be absorbed by the first electrode pattern layer 131 and the second electrode pattern layer 132. Accordingly, it can be checked which position (coordinate) of the digitizer 10*a* the electromagnetic pen 8 is approximate to (e.g., the position of the electromagnetic pen 8 relative to the first electrode pattern layer 131 and the second electrode pattern layer 132 may be determined).

In addition, for example, the first electrode pattern layer 131 and the second electrode pattern layer 132 may generate a magnetic field or electromagnetic field according to a current input thereto, and the generated magnetic field or electromagnetic field may be absorbed into the electromagnetic pen 8.

As described above, the electromagnetic pen 8 and the digitizer 10*a* communicated with each other, so that various input functions can be performed.

Figure 4:
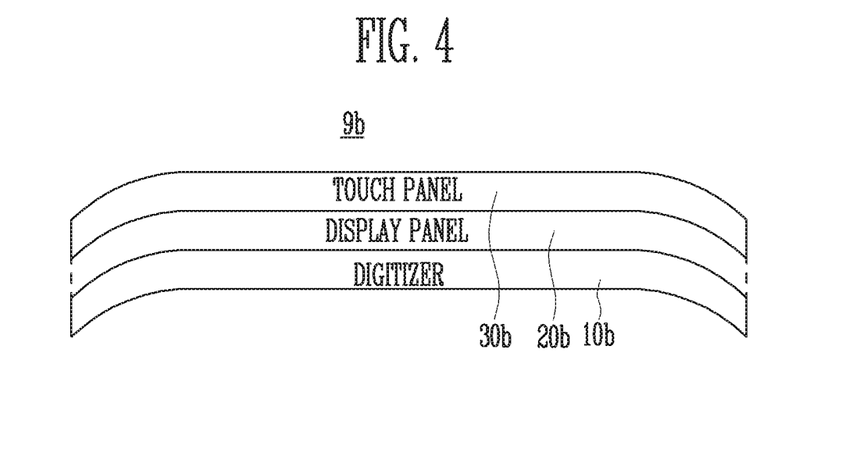
FIG. 4 is a view illustrating a display device according to some embodiments of the present disclosure.

FIG. 4 is a view illustrating a display device according to some embodiments of the present disclosure.

Referring to FIG. 4, the display device 9*b* according to some embodiments of the present disclosure includes a touch panel 30*b*, a display panel 20*b*, and a digitizer 10*b*.

Unlike the display device 9*a* of FIG. 1, the display device 9*b* of FIG. 4 has curved side portions (e.g., at a right end and a left end of the display device 9*b* of FIG. 4). In this case, both side portions of each of the touch panel 30*b*, the display panel 20*b*, and the digitizer 10*b* may be curved. In some embodiments, when the display device 9*b* has a quadrangular shape, both side portions of the display device 9*b* may mean side portions opposite to each other.

In some embodiments, the display device may have only one curved side portion and the other side portion may be a flat side portion. In such a case, each of the touch panel, the display panel, and the digitizer may have only one curved side portion and one flat side portion.

Descriptions of the touch panel 30*b*, the display panel 20*b*, and the digitizer 10*b* correspond to those of the touch panel 30*a*, the display panel 20*a*, and the digitizer 10*a* of FIG. 1, and therefore, overlapping descriptions will be omitted to avoid redundancy.

Although a reference numeral of the digitizer 10*b* is illustrated in FIG. 4, the structure of FIG. 4 may be applied to each of digitizers 10*b*, 10*c*, 10*d*, and 10*e* of FIGS. 5 to 8.

Figure 5:
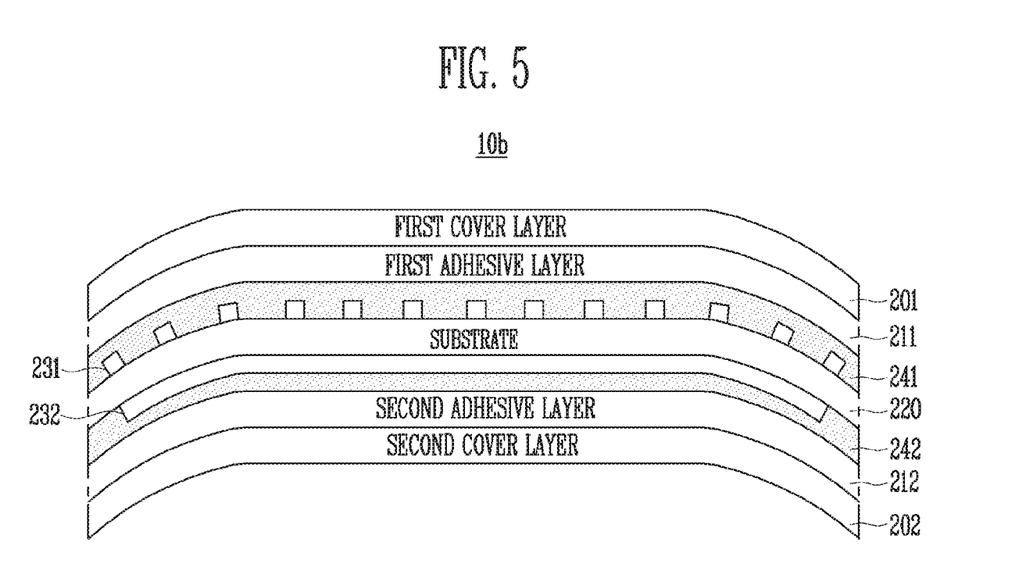
FIG. 5 is a view illustrating a digitizer according to a second embodiment of the present disclosure.

FIG. 5 is a view illustrating a digitizer according to a second embodiment of the present disclosure.

Referring to FIG. 5, the digitizer 10*b* according to the second embodiment of the present disclosure includes a first cover layer 201, a first adhesive layer 211, a first intermediate layer 241, a first electrode pattern layer 231, a substrate 220, a second electrode pattern layer 232, a second intermediate layer 242, a second adhesive layer 212, and a second cover layer 202.

Hereinafter, components of FIG. 5 different from those of FIG. 2 will be described. Descriptions of the layers 201, 211, 241, 231, 220, 232, 242, 212, and 202 correspond to those of the layers 101, 111, 141, 131, 120, 132, 142, 112, and 102 of FIG. 2, respectively, and therefore, overlapping descriptions will be omitted.

The digitizer 10*b* has a shape in which at least one side portion of the digitizer 10*b* is curved, and accordingly, each of the layers 201, 211, 241, 231, 220, 232, 242, 212, and 202 have a shape in which at least one side portion of the respective layers is curved.

Each of the first cover layer 201 and the second cover layer 202 may be thermally deformed at a first thermal deformation temperature or higher. For example, when the first cover layer 201 and the second cover layer 202 are made of PI, the first thermal deformation temperature may be approximately 400° C. In this case, when a manufacturing process of the digitizer 10*b* is performed at 400° C. or lower, the first cover layer 201 and the second cover layer 202 may maintain elasticity to return to their original shape even after the manufacturing process is performed. In the digitizer including the curved side portion, the elasticity may result in separation between the circuit elements 231, 220, and 232 and the cover layers 201 and 202.

In order to solve such a problem, in some embodiments, each of the first intermediate layer 241 and the second intermediate layer 242 may be thermally deformed at a second thermal deformation temperature or higher. That is, each of the first intermediate layer 241 and the second intermediate layer 242 may be thermally deformed at the second thermal deformation temperature or higher, so that the thermally deformed shape can be maintained even when temperature is lowered. For example, when each of the first intermediate layer 241 and the second intermediate layer 242 is made of polyurethane acrylate, the second thermal deformation temperature may be approximately 90° C.

For example, if the second thermal deformation temperature is 90° C. or higher, the first intermediate layer 241 and the second intermediate layer 242 may each maintain the shape of the curved side portion of the digitizer 10*b* against the elasticity of the first cover layer 201 and the second cover layer 202 even when the manufacturing process of the digitizer 10*b* is performed at 400° C. or lower. Thus, in some embodiments, the first intermediate layer 241 and the second intermediate layer 242 may serve as structure maintaining layers, and can prevent separation between the cover layers 201 and 202 and the circuit elements 231, 220, and 232.

In some embodiments, an impact absorbing layer may be located on the top of the first cover layer 201. According to such embodiments, the first intermediate layer 241 and the second intermediate layer 242 can serve both as structure maintaining layers, and also as the planarization layers described with reference to FIG. 2.

Figure 6:
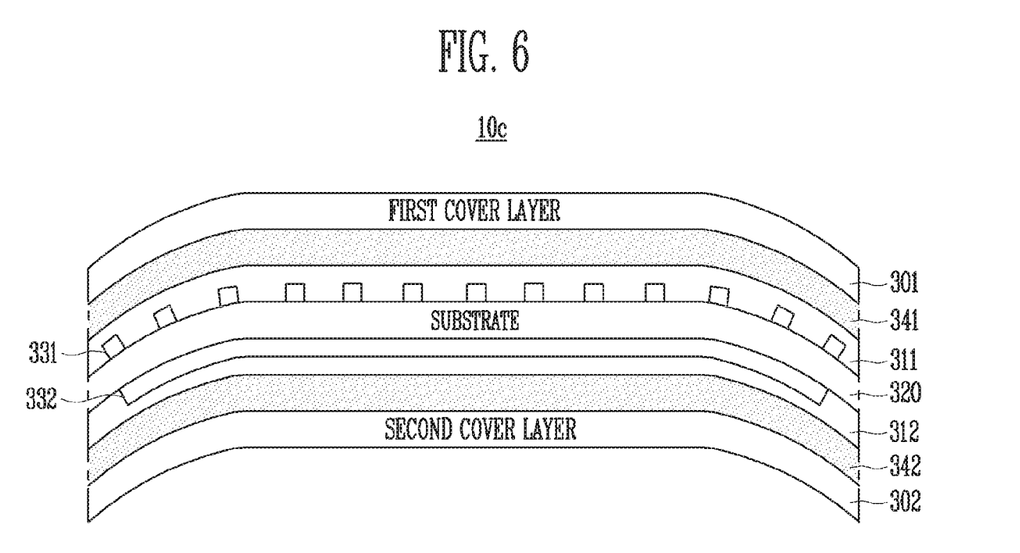
FIG. 6 is a view illustrating a digitizer according to a third embodiment of the present disclosure.

FIG. 6 is a view illustrating a digitizer according to a third embodiment of the present disclosure.

Referring to FIG. 6, the digitizer 10*c* includes a first cover layer 301, a first intermediate layer 341, a first adhesive layer 311, a first electrode pattern layer 331, a substrate 320, a second electrode pattern layer 332, a second adhesive layer 312, a second intermediate layer 342, and a second cover layer 302.

Descriptions of the layers 301, 341, 311, 331, 320, 332, 312, 342, and 302 correspond to those of the layers 201, 211, 241, 231, 220, 232, 242, 212, and 202 of FIG. 5, respectively, and therefore, overlapping descriptions will be omitted.

Unlike the digitizer 10b of FIG. 5, in the digitizer 10c of FIG. 6, the first adhesive layer 311 is located on the top of the first electrode pattern layer 331, and the first intermediate layer 341 is located between the first adhesive layer 311 and the first cover layer 301. In addition, the second adhesive layer 312 is located on the bottom of the second electrode pattern layer 332, and the second intermediate layer 342 is located between the second adhesive layer 312 and the second cover layer 302.

Similarly, as described with reference to FIG. 5, in this embodiment of FIG. 6, the first intermediate layer 341 and the second intermediate layer 342 may serve as structure maintaining layers and planarization layers. However, when comparing this embodiment with the embodiment of FIG. 5, each intermediate layer 341 and 342 is located closer to the corresponding cover layer 301 and 302, respectively, and thus the function of the structure maintaining layer can be further exhibited as compared with the embodiment of FIG. 5.

Figure 7:
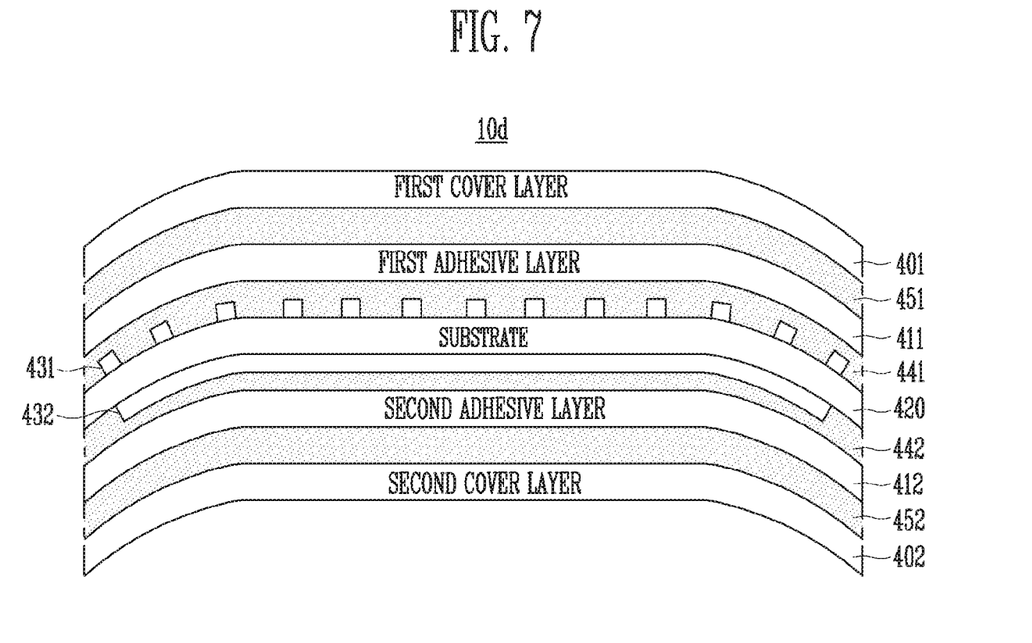
FIG. 7 is a view illustrating a digitizer according to a fourth embodiment of the present disclosure.

FIG. 7 is a view illustrating a digitizer according to a fourth embodiment of the present disclosure.

Referring to FIG. 7, the digitizer 10d includes a first cover layer 401, a third intermediate layer 451, a first adhesive layer 411, a first intermediate layer 441, a first electrode pattern layer 431, a substrate 420, a second electrode pattern layer 432, a second intermediate layer 442, a second adhesive layer 412, a fourth intermediate layer 452, and a second cover layer 402.

Descriptions of the layers 401, 411, 441, 431, 420, 432, 442, 412, and 402 correspond to those of the layers 201, 211, 241, 231, 220, 232, 242, 212, and 202 of FIG. 5, respectively, and therefore, overlapping descriptions will be omitted.

Unlike the digitizer 10b of FIG. 5, the digitizer 10d of FIG. 7 further includes the third intermediate layer 451 and the fourth intermediate layer 452. The third intermediate layer 451 may be located between the first adhesive layer 411 and the first cover layer 401. The fourth intermediate layer 452 may be located between the second adhesive layer 412 and the second cover layer 402. The third intermediate layer 451 and the fourth intermediate layer 452 may be configured similarly to the first intermediate layer 441 and the second intermediate layer 442, and therefore, overlapping descriptions will be omitted.

In this embodiment, each of the intermediate layers 441, 442, 451, and 452 may serve as a structure maintaining layer and a planarization layer. However, according to this embodiment, the first intermediate layer 441 and the second intermediate layer 442, which are respectively in contact with the first electrode pattern layer 431 and the second electrode pattern layer 432, can serve as the planarization layers in priority. In addition, the third intermediate layer 451 and the fourth intermediate layer 452, which are respectively in contact with the first cover layer 401 and the second cover layer 402, can serve as the structure maintaining layers in priority.

Figure 8:
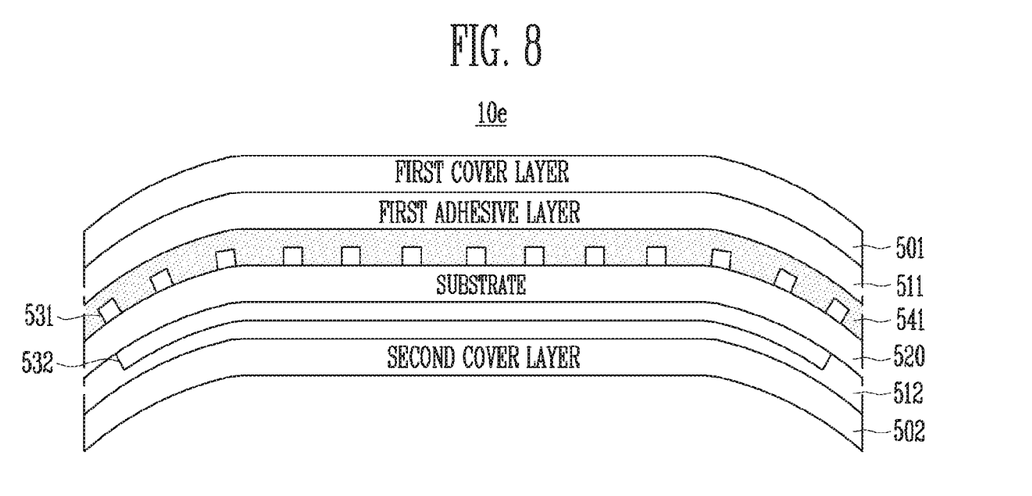
FIG. 8 is a view illustrating a digitizer according to a fifth embodiment of the present disclosure.

FIG. 8 is a view illustrating a digitizer according to a fifth embodiment of the present disclosure.

Referring to FIG. 8, the digitizer 10e includes a first cover layer 501, a first adhesive layer 511, a first intermediate layer 541, a first electrode pattern layer 531, a substrate 520, a second electrode pattern layer 532, a second adhesive layer 512, and a second cover layer 502.

Descriptions of the layers 501, 511, 541, 531, 520, 532, 512, and 502 correspond to those of the layers 201, 211, 241, 231, 220, 232, 212, and 202 of FIG. 5, respectively, and therefore, overlapping descriptions will be omitted.

Unlike the digitizer 10b of FIG. 5, in the digitizer 10e of FIG. 8, the second intermediate layer is omitted. That is, in the digitizer 10e, a second intermediate layer is not located between the second electrode pattern layer 532 and the second cover layer 502.

When assuming that the display panel 20b is located on the top of the first cover layer 501, an impact absorbing layer may be located between the display panel 20b and the first cover layer 501. Thus, the first intermediate layer 541 can allow an uneven pattern of the impact absorbing layer to be further planarized as compared with embodiments containing the second intermediate layer.

According to the embodiment of FIG. 8, the digitizer 10e can have a reduced thickness while exhibiting a planarizing function and a structure maintaining function.

In the digitizer and the display device including the same according to the present disclosure, the uneven pattern of the electrode pattern layer is not viewed by a user, and separation between the cover layer and the electrode pattern layer can be prevented.

Although example embodiments of the present invention have been described, it is understood that the present invention is not limited to these example embodiments, but various changes and modifications can be made by one of ordinary skill in the art within the spirit and scope of the present invention as hereinafter claimed. As would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Therefore, the disclosed subject matter is not to be limited to any single embodiment described herein, and the above-described embodiments are to be considered illustrative and not restrictive. Accordingly, the scope of the present inventive concept shall be determined only according to the attached claims, and equivalents thereof.

What is claimed is:

1. A digitizer comprising:
a first electrode pattern layer;
a first cover layer thermally deformable at a first thermal deformation temperature or higher;
a first intermediate layer located between the first electrode pattern layer and the first cover layer, the first intermediate layer being thermally deformable at a second thermal deformation temperature or higher, wherein the second thermal deformation temperature is lower than the first thermal deformation temperature; and
a first adhesive layer located between the first electrode pattern layer and the first cover layer,
wherein the first intermediate layer contacts the first electrode pattern layer and planarizes a step difference corresponding to the first electrode pattern layer by covering a height of the first electrode pattern layer, a portion of the first intermediate layer being below a top surface of the first electrode pattern layer, wherein the first adhesive layer is located between the first intermediate layer and the first cover layer, wherein the first electrode pattern layer, the first cover layer, the first intermediate layer, and the first adhesive layer have curved side portions, wherein the curved side portion of the first cover layer maintains elasticity to return to an original shape, and wherein the curved side portion of the first intermediate layer maintains a curved shape against the elasticity of the curved side portion of the first cover layer.

2. The digitizer of claim 1, further comprising:
a second cover layer thermally deformable at the first thermal deformation temperature or higher;
a second electrode pattern layer located between the second cover layer and the first electrode pattern layer; and
a substrate located between the first electrode pattern layer and the second electrode pattern layer.

3. The digitizer of claim 2, further comprising:
a second intermediate layer covering the second electrode pattern layer, the second intermediate layer being thermally deformable at the second thermal deformation temperature or higher; and
a second adhesive layer located between the second intermediate layer and the second cover layer.

4. The digitizer of claim 3, further comprising an impact absorbing layer located on the first cover layer.

5. The digitizer of claim 3, wherein the substrate, the second electrode pattern layer, and the second cover layer have curved side portions.

6. The digitizer of claim 3, further comprising:
a third intermediate layer located between the first adhesive layer and the first cover layer, the third intermediate layer being thermally deformable at the second thermal deformation temperature or higher; and
a fourth intermediate layer located between the second adhesive layer and the second cover layer, the fourth intermediate layer being thermally deformable at the second thermal deformation temperature or higher.

7. The digitizer of claim 2, further comprising a second adhesive layer in contact with the second electrode pattern layer, the second adhesive layer being located between the second electrode pattern layer and the second cover layer.

8. The digitizer of claim 7, wherein the substrate, the second electrode pattern layer, and the second cover layer have curved side portions.

9. The digitizer of claim 2, further comprising a second adhesive layer in between the second cover layer and the second electrode pattern layer, the second adhesive layer contacting both the second cover layer and the second electrode pattern layer.

10. The digitizer of claim 1, wherein the first adhesive layer comprises a material different from the first intermediate layer.

11. A display device comprising:
a display panel;
a touch panel located at a top of the display panel; and
a digitizer located at a bottom of the display panel,
wherein the digitizer comprises:
a first electrode pattern layer;
a first cover layer thermally deformable at a first thermal deformation temperature or higher;
a first intermediate layer located between the first electrode pattern layer and the first cover layer, the first intermediate layer being thermally deformable at a second thermal deformation temperature or higher, wherein the second thermal deformation temperature is lower than the first thermal deformation temperature; and
a first adhesive layer located between the first electrode pattern layer and the first cover layer,
wherein the first intermediate layer contacts the first electrode pattern layer and planarizes a step difference corresponding to the first electrode pattern layer by covering a height of the first electrode pattern layer, a portion of the first intermediate layer being below a top surface of the first electrode pattern layer,
wherein the first adhesive layer is located between the first intermediate layer and the first cover layer,
wherein the first electrode pattern layer, the first cover layer, the first intermediate layer, and the first adhesive layer have curved side portions,
wherein the curved side portion of the first cover layer maintains elasticity to return to an original shape, and
wherein the curved side portion of the first intermediate layer maintains a curved shape against the elasticity of the curved side portion of the first cover layer.

12. The display device of claim 11, wherein the digitizer further comprises an impact absorbing layer located on the first cover layer.

13. The digitizer of claim 11, wherein the first adhesive layer comprises a material different from the first intermediate layer.

14. The digitizer of claim 11, further comprising:
a second cover layer thermally deformable at the first thermal deformation temperature or higher;
a second electrode pattern layer located between the second cover layer and the first electrode pattern layer; and
a substrate located between the first electrode pattern layer and the second electrode pattern layer.

15. The digitizer of claim 14, further comprising a second adhesive layer in between the second cover layer and the second electrode pattern layer, the second adhesive layer contacting both the second cover layer and the second electrode pattern layer.

* * * * *